US011243939B1

(12) United States Patent
Mikhaylyuta et al.

(10) Patent No.: US 11,243,939 B1
(45) Date of Patent: Feb. 8, 2022

(54) EXTENDED QUERY FAMILIES

(71) Applicant: Amazon Technologies, Inc., Seattle, WA (US)

(72) Inventors: Yevgeniy Mikhaylyuta, Sammamish, WA (US); Timothy Daniel Cole, Seattle, WA (US); John Michael Morkel, Seattle, WA (US); Christopher Richard Jacques de Kadt, Seattle, WA (US); Allan Henry Vermeulen, Corvallis, OR (US)

(73) Assignee: Amazon Technologies, Inc., Seattle, WA (US)

( * ) Notice: Subject to any disclaimer, the term of this patent is extended or adjusted under 35 U.S.C. 154(b) by 301 days.

(21) Appl. No.: 15/201,118

(22) Filed: Jul. 1, 2016

(51) Int. Cl.
*G06F 16/23* (2019.01)
*G06F 16/28* (2019.01)
*G06F 16/22* (2019.01)

(52) U.S. Cl.
CPC ...... *G06F 16/2365* (2019.01); *G06F 16/2255* (2019.01); *G06F 16/2358* (2019.01); *G06F 16/285* (2019.01)

(58) Field of Classification Search
CPC .......... G06F 17/30371; G06F 17/3033; G06F 17/30368; G06F 17/30598; G06F 16/2365; G06F 16/2255; G06F 16/2358; G06F 16/285
See application file for complete search history.

(56) References Cited

U.S. PATENT DOCUMENTS

| | | | | |
|---|---|---|---|---|
| 6,381,605 B1* | 4/2002 | Kothuri | ............. | G06F 17/30327 |
| 7,996,633 B2* | 8/2011 | Zimmerer | ........... | G06F 11/1662 |
| | | | | 707/704 |
| 2003/0200214 A1* | 10/2003 | Doole | ................ | G06F 16/2336 |
| | | | | 707/999.008 |
| 2006/0230017 A1* | 10/2006 | Larson | .............. | G06F 17/30457 |
| 2010/0332765 A1* | 12/2010 | Cypher | ............... | G06F 12/0811 |
| | | | | 711/141 |
| 2015/0134917 A1* | 5/2015 | P | ........................... | G06F 16/283 |
| | | | | 711/144 |

* cited by examiner

*Primary Examiner* — Kannan Shanmugasundaram
(74) *Attorney, Agent, or Firm* — Davis Wright Tremaine LLP

(57) ABSTRACT

A journaled database system may comprise data nodes that collectively maintain a collection of data and provide clients with read and write access to the collection. Correlated classification functions may be associated with read and write operations, such that items affected by a write operation are classified similarly to items accessed during a read operation. Read and write signatures may be formed based on the classification. Conflicts may be detected by comparing the read and write signatures for equivalent or overlapping classifications.

20 Claims, 7 Drawing Sheets

US 11,243,939 B1

EXTENDED QUERY FAMILIES

BACKGROUND

Recently, distributed computing systems have been employed to maintain collections of data. Multiple computing nodes, potentially distributed across various geographic regions and data centers, may be employed to collectively provide applications with an efficient mechanism for storing and retrieving data.

A distributed computing system may provide services to a potentially large number of users, and may process a large volume of requests to access data maintained by the system. In some instances, requests to read and write data may cause conflicts with other such requests. It may be challenging to detect conflicts while maintaining the efficiency of the system.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
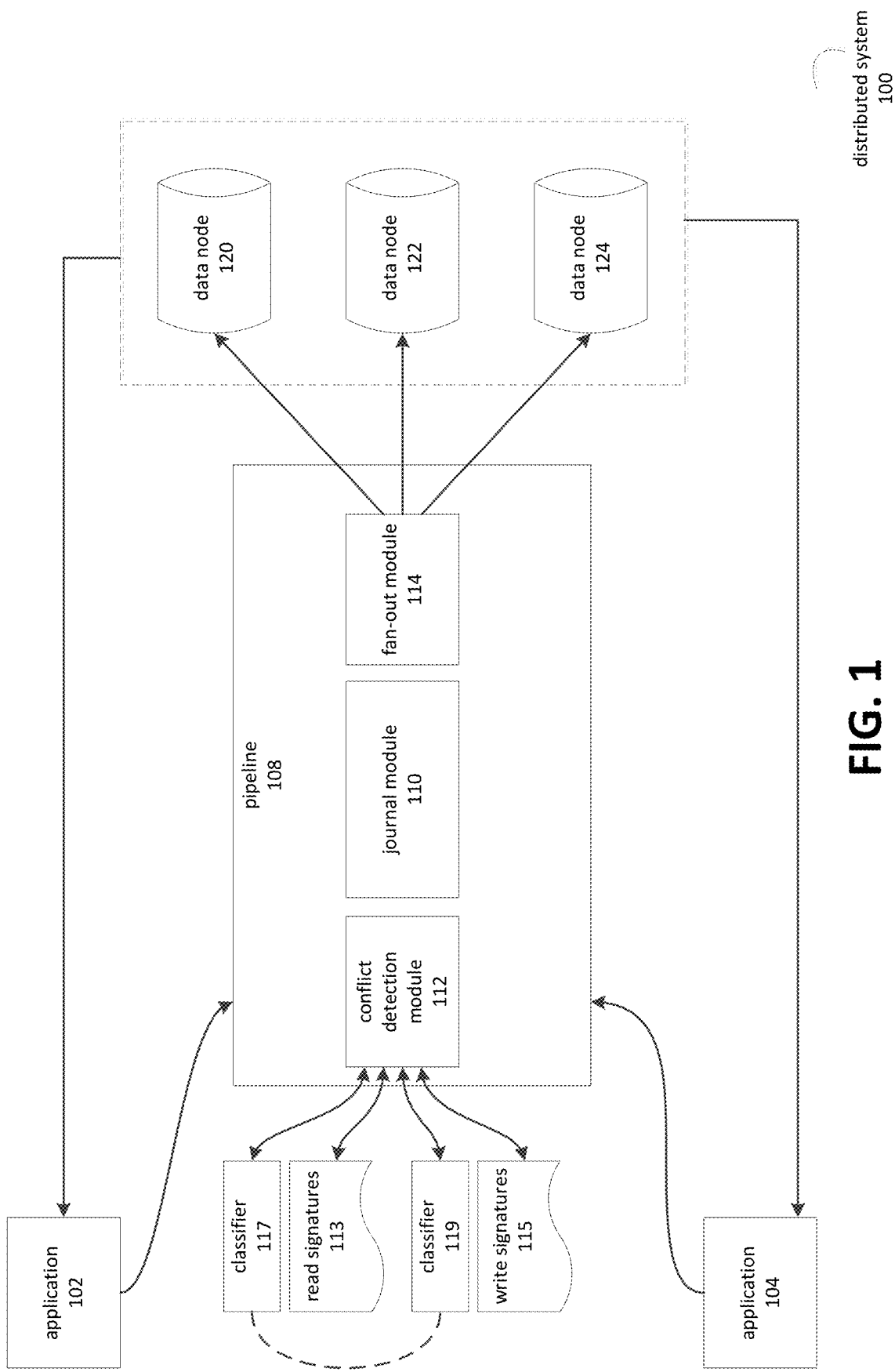
FIG. 1 is a block diagram depicting a distributed system using journaled updates.

Disclosed herein are systems, methods, and computer program products pertaining to distributed databases. Example embodiments may comprise a journaling component in which requests to modify the state of a collection of data are processed by a pipeline component or subsystem. The pipeline component may analyze the requests in order to identify potential conflicts and then, in the absence of a conflict, durably store the instructions for later application to one of a number of storage nodes.

Conflicts may be detected using classification functions associated with read and write operations. A classification function may categorize a write operation, such as inserting, updating, or deleting an item, based on the attributes of the item. Similarly, for a read operation, such as a query, the items potentially accessed by the query may be categorized based on attributes of the query. By using corresponding classification functions, potential conflicts may be detected by correlating read signatures and write signatures that were formed using the classifications.

In an example, a system or computer-implemented method may involve operations that comprise receiving instructions for identifying a classification of an item stored in a collection of items. The instructions may, for example, correspond to a function that accepts one or more parameters. The instructions may be processor-executable instructions, script code, query language code, and so forth. Typically, the parameters may correspond to attributes of the item, and the instructions may return an identifier corresponding to a classification obtained by evaluating the parameters.

The system or computer-implemented method may further involve receiving a request to modify an item of the collection. In response to receiving the request, it may be determined that that modified item is associated with a first classification by executing the first instructions. An attribute of the item may be supplied to the first instructions as a parameter.

The system or computer-implemented method may perform further operations in response to receiving information indicative of a query involving items in the collection. It may be determined that at least one of the affected items has a second classification. The second classification may be determined by executing a second instructions, correlated to the first instructions, that classifies items accessed when the query is executed. Parameters to the second instructions may comprise attributes of the queries, such as values derived from a query predicate, such as a "where" clause.

A write signature may be formed based on the first classification. The write signature may, for example, be stored as a hash of an identifier of the first classification. Similarly, a read signature may be stored as a hash of an identifier of the second classification.

A conflict may be detected by at least comparing the write signature for the first classification to the read signature for the second classification. If they are equivalent or overlapping, a conflict between a read and write operation may have occurred.

FIG. 1 is a block diagram depicting a distributed system 100 employing journaled updates. The distributed system 100 may consist of an update pipeline 108. The update pipeline 108 may process requests to update data maintained by the system, using a journal-based technique. The update pipeline 108 may validate requests to modify data maintained by the system and make the requests durable upon validation. The data may be subsequently written to one or more data nodes 120-124. This approach allows applications 102, 104 to issue requests to modify the data state without needing to wait for the data to be fully propagated throughout the system.

The data nodes 120-124 may individually or collectively maintain one or more collections of data. The data may be structured in accordance with, or in compliance with, a schema. A schema may refer to aspects of how the data in the collections is structured, such as the tables, columns, data types, and so forth. The schema may also define modes of interaction with the database, such as what projections, views, and data types are available for use in queries issued by the applications 102, 104. In some cases, the schema may define constraints on the ranges of data. For example, a constraint might constrain a counter to fall within a predefined numeric range. In another example, a constraint might limit a textual column to certain delineated values.

Applications 102, 104 may obtain data from the data nodes 120-124 in a manner consistent with, or compliant with, the schema. The applications 102, 104 may submit various commands to store or retrieve data using references to various elements defined by the schema. Requests to modify data may be handled through the pipeline 108, while requests to obtain data may be handled through the data nodes 120-124.

The pipeline 108 may be a component of the distributed system 100. The pipeline 108 may process requests to modify data and to store new data. The pipeline 108 may durably store information describing requests to modify data or store new data, without waiting for the corresponding changes to be fully applied to the corresponding data nodes 120-124. This may improve the efficiency of applications 102, 104 because the applications 102, 104 are not required to wait for a requested change to be fully propagated throughout the system 100.

A conflict detection module 112 may identify conflicts between a pending request to update the data state, other pending requests, and the current data state. One example of a conflict is a requested modification to a data item that is based on out of date information. For example, if an update to an item was intended to increment a counter by '10,' storing '15' as the counter value would be correct only if the current value of the counter, prior to the increment, was '5.' To perform the update, a thread in the system might first read the current value of the counter and then write a corresponding updated value. In this example, a conflict might be detected if the value of the counter was changed to '8' by some other thread, after the original thread had read the current value as '5.'

The journal module 110 may maintain a durable store of instructions to modify the data state. For example, the conflict detection module 112 might validate a request to modify the data state. If no conflict is detected and the request is deemed valid, the journal module 110 might then store corresponding instructions to modify the data state on a storage device. The instructions may be stored by the journal module 110 so as to make the record of the instructions durable, so that the changes will be applied eventually to the data nodes 120-124 even in the event of a power interruption or other system failure. The journal module 110 may typically store instructions to modify the data state along with sequencing information, such as a global timestamp or serial number.

A fan-out module 114 may apply requested changes to the collections of data maintained by the data nodes 120-124. In some instances, one or more of the data nodes 120-124 may maintain distinct collections of data. In other instances, one or more of the data nodes 120-124 maintain partitions of a larger collection. In other instances, one or more of the data nodes 120-124 may maintain replicas of other partitions or collections.

Referring again to the conflict detection module 112, a collection of read signatures 113 and write signatures 115 may represent operations processed by the pipeline 108. The read signatures 113 may represent operations associated with accessing or retrieving—i.e., reading—data in the collection of data maintained by the data nodes 120-124. The write signatures 115 may represent operations associated with modifying or changing—i.e., writing—data to the collection. The conflict detection module 112 may maintain the signatures 113, 115 to represent read and write operations processed by the pipeline 108 and to detect potential conflicts.

The conflict detection module 112 may detect conflicts between read operations and write operations using correlation between the read signatures 113 and the write signatures 115. For example, an entry in the read signatures 113 might indicate that a particular column value has been read, while one or more write signatures 115 may indicate that the particular column value has been modified. If the read occurred after the write, the write may be out of date. The conflict detection module 112 may detect potential conflicts between operations by at least identifying corresponding entries in the read signatures 113 and write signatures 115 and, in some cases, examining additional factors such as the respective times the operations occurred, the specific nature of the operation (such as incrementing, decrementing, or replacing a value), and other factors.

The conflict detection module 112 may employ various techniques for forming the read and write signatures 113, 115 and storing the signatures 113, 115 in memory or on a persistent storage device. The conflict detection module 112 may form and store the signatures 113, 115 so as to permit correlation between read and write operations that pertain to identical or similar items.

In various embodiments described herein, the conflict detection module 112 may use classifiers 117, 119 to form the signatures 113, 115. More generally, the classifiers 117, 119 may be used to correlate between operations that affect the same underlying value(s).

The read signatures 113 may be generated based at least in part on a classifier 117. The classifier 117 may be a function or other set of instructions that may be executed to identify a classification associated with a query. The classifier 117 may be executed using one or more parameters supplied to the classifier 117. The parameters may use values based on attributes of the query. For example, classifier function might return a classification of a query based on the value of an inventory number. For illustrative purposes, assume that the inventory number is constrained to the range 1-100. The classifier 117 might then be a function that uses the inventory number as a parameter, and returns the classifications 'A,' 'B,' 'C,' and 'D' based on the inventory numbers 1-25, 26-50, 51-75, 76-100, respectively.

The classifier 119 used for write signatures 115 may be similar to the classifier 117 used for read signatures 113. In some instances, the same classifier 117, 119 may be used for both read signatures 113 and write signatures 115. When not identical, the classifiers 117, 119 are still correlated to some degree, such that operations involving the same row may result in the same classification. For example, the classifier used for write signature 115 might be a relatively fine-grained classifier, perhaps producing classifications 'A,' 'B,' 'C,' and 13' as described previously. The corresponding read classifier used with read signature 113, on the other hand, might be a course-grained classifier that returns classifications 'X' and 'Y,' where 'X' corresponds to 'A' and 'B' and 'Y' corresponds to 'C' and 'D.'

Figure 2:
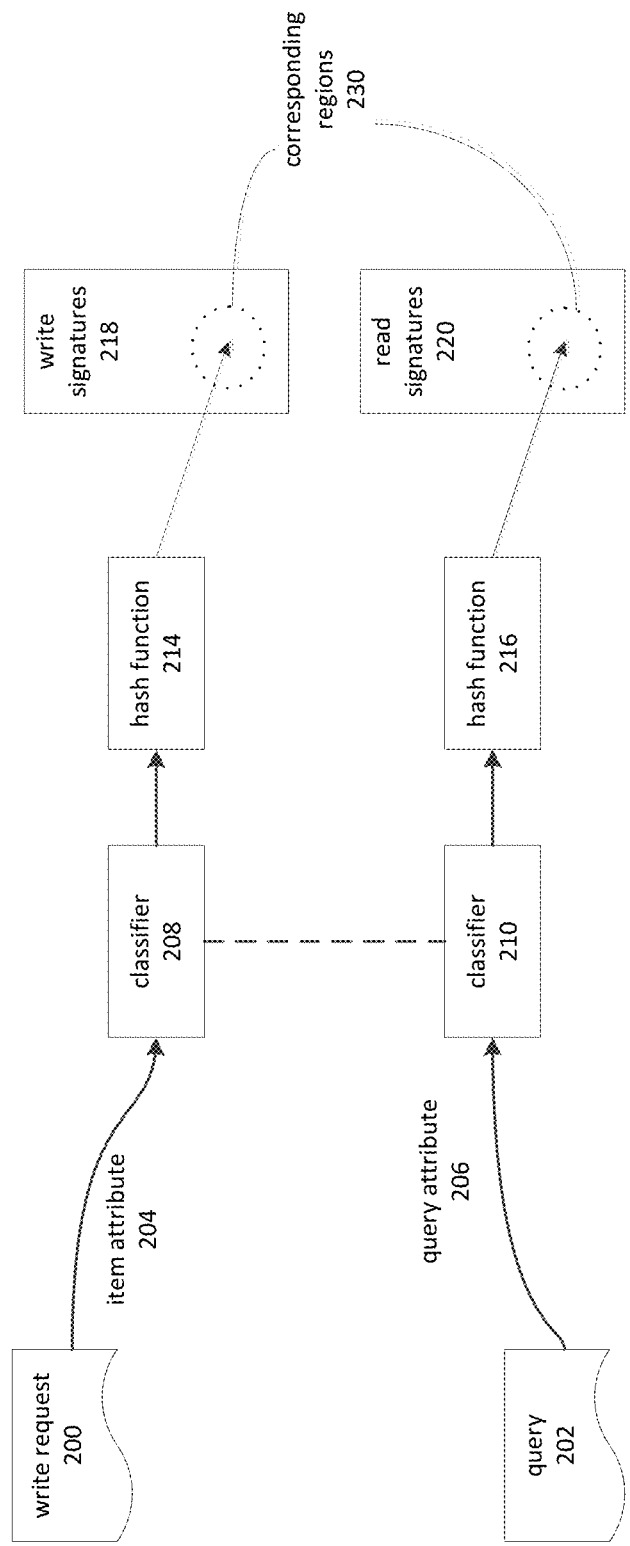
FIG. 2 is a block diagram depicting formation of read and write signatures.

FIG. 2 is a block diagram depicting formation of read and write signatures. As depicted by FIG. 2, information indicative of requests to insert or update information stored in a collection of data may be stored in a write signature 218. Similarly, information indicative of queries of the collection may be stored in read signature 220. The write and read signatures 218, 220 may, in some embodiments, be maintained in the memory of a computing device as a hash structure. Conceptually, then, the write and read signatures 218, 220 may be represented as entries in a hash space, such that corresponding regions 230 of the hash spaces may correspond to potentially conflicting operations. The corresponding regions 230 of the respective hash spaces may be equivalent in some cases, while in other cases may be overlapping or coinciding regions of the hash spaces.

A write request 200 may comprise instructions to insert, update, or delete an item in a collection of data. For example, a field or column of the item might be modified, a new item inserted into the collection, or an existing item deleted from the collection. An item attribute 204 may be derived from the write request 200. The item attribute 204 may, for example, be a field or column of the item that is to be modified. In some cases, the item attribute 204 may comprise a composite of fields or columns of the item, or the item attribute 204 may be derived from one or more fields or columns of the item.

The item attribute 204 may be supplied as an input parameter to the classifier 208. Note that although FIG. 2 depicts the classifiers 208, 210 as accepting single inputs, they may be multivariate in some instances. In other words, the classifiers 208, 210 may accept multiple parameters on which the output classification may be based.

The classifier 208 may be executed, in view of the supplied parameter, to generate an output classification. The output classification may be an identifier of a class, such as a numeric value or a string value. In some instances, the output classification may be a mapping between an input set and an output set. For example, the input set might be the range of values 1-100, while the output set might be the integer values between 1 and 4.

The classifier 208 applied to the item attribute 204 may, in some instances, produce precise classifications. For example, if a primary key or composite primary key is used as the item attribute 204 that is supplied as a parameter, and if the classifier 208 is an identify function, then the unique primary key input to the classifier 208 is also output as the class. In other cases, however, the classifier 208 may use a more course granularity. For example, the classifier 208 may produce the same classifications, based on the same input parameter(s), as a classifier 210 used to classify a query 202 that is requesting access to items in the collection of data.

FIG. 2 depicts that the classifier 208 used with the write request 200 may be correlated to the classifier 210 used with the query 202. In some cases, the same classifier function 208, 210 may be used for both write request 200 and query 202. Correlation may refer to produce the same classification given a set of input parameters, as well as refer to producing related or overlapping classifications. More generally, the correlation may refer to explicit correlations between the classifiers used with a given write request and the classifiers used with a given query. The classifiers 208, 210 may be supplied as configuration data, or otherwise provided, so that the system is aware of correlations between requests to write data and queries to retrieve data, and their respective classifier functions 208, 210.

The classifier 210 may classify the query 202 using an input parameter that is based on a query attribute 206. The query attribute 206 may refer to predicates included in the query. For example, a query "select * from T where C=>1 AND C<=10" includes a predicate clause that references the column 'C' and a range of values from 1 and 10. The classifier 210 might therefore use a parameter based on attributes including the referenced column 'C,' its minimum value '1,' and its maximum value '10.'

The output value of each classifier 208, 210 may be applied to a hash function 214, 216 and then stored in a write signatures 218 structure or read signatures 220 structure, as appropriate. In the case of the write request 200, the item attribute 204 may be supplied as an input parameter to the classifier 208, the output of which is then applied to a hash function 214. The output of the hash function 214 may refer to a region of a hash space represented in the write signatures 218.

Note that the granularity of the classifiers 208, 210 may result in a given region of a hash space to refer to multiple items. For example, a plurality of write requests, such as the depicted write request 200, may refer to the same class of items even if each individual write request is directed to a different item. Similarly, the classifier 210 may classify items potentially accessed via execution of the query 202 such that multiple items are included in each class. For example, for the query "select * from T whereC>100" the classifier 210 might associate all items withC>100 in a first class, and all items with C<=100 in a second class.

In various embodiments, the classifiers 208, 210 and their input parameters are selected based on correspondence of the resulting classifications. In other words, the classifiers 208, 210 and their input parameters may be selected so that an item affected by an update request is classified the same as a query that would potentially access the same item.

A request to update an item may be classified based on two states, corresponding to states of the item prior to and subsequent to the update. Inserted items and deleted items may also be classified based on two states, one being a "null" state.

Figure 3:
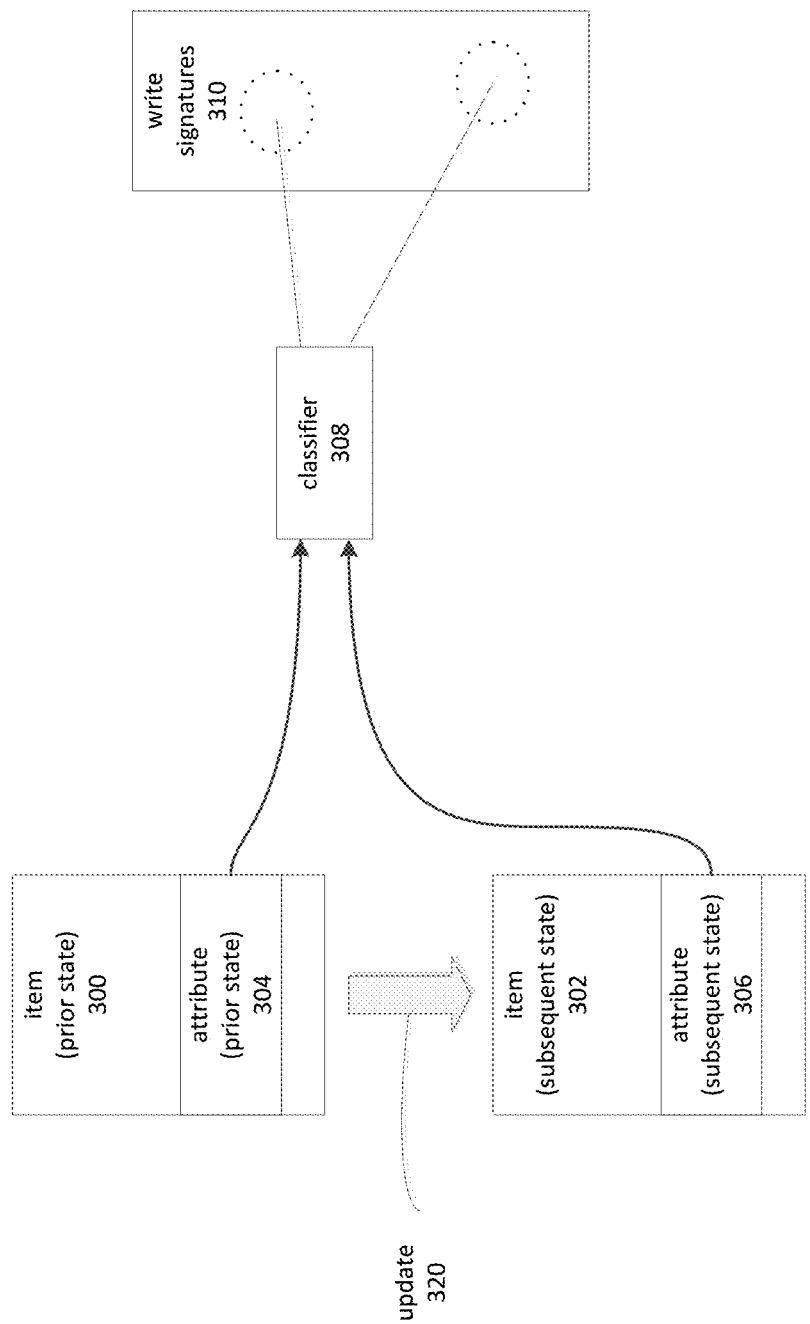
FIG. 3 is a block diagram depicting classification of an item for corresponding write signatures.

FIG. 3 is a block diagram depicting classification of an item for corresponding write signatures. An item 300 may comprise an attribute 304. For illustrative purposes, FIG. 3 presumes that the item is to be updated. The item 300 may therefore be described as being in a prior state, relative to the update. Similarly, the attribute 304 of the item may be described as being in the prior state, again relative to the update. After the update 320 has been applied, the same item 302 may be described as being in a subsequent state, and may have an attribute 306 also in a subsequent state. For example, a request to update an item might include instructions to change the value of a column C from '1' to '2.' In this case the prior state of the attribute, sometimes referred to as an initial state, would be '1' and the subsequent state of the attribute would be '2.' The item 300 may be said to transition from a prior state to a subsequent state based on one of its constituent members transitioning from a prior state to a subsequent state.

Two write signatures may be generated in response to a request to update an item. As seen in FIG. 3, the item 300 in its prior state may be used to generate a first entry in the write signatures 310. The classifier 308 might, for example, be executed using the value of the attribute 304 in its state prior to the update, thus generating a first write signature. The first signature might occupy a first region within a hash space that represents write signatures 310.

After the update has been applied, a second write signature may be generated. The classifier 308 might be executed using the value of the attribute 306 in its state subsequent to the update. This may generate a second write signature. The second write signature might occupy a different hash space since the first. Since the value of the parameter to the classifier 308 may have changed, the output of the classifier, i.e. the classification, may have also changed.

In the example of FIG. 3, separate write signatures may be stored for classifications of an item in its pre-change state and its after-change stage, respectively. A read signature might therefore correspond to the pre-change signature or the post-change signature. Timestamp or sequence number information may be stored with the signatures to correlate to the proper version of the signature. Read signatures and write signatures may be associated with timestamps, sequence numbers, or other information. The timestamp, sequence numbers, or other information might, for example, correspond to a transaction time or transaction sequence. If a read signature is associated with a transaction whose sequence number comes after a transaction in which the corresponding item was modified, the post-change write signature could be correlated to the read signature. Similarly, if the read is associated with a transaction that occurred before the write, the pre-change write signature might be correlated to the read signature.

Queries and other transactions that involve reading data—including in some cases operations that implicitly involve accessing data—may be associated with classifiers using one or more of a variety of techniques. In general terms, a read classifier may be chosen based on its producing correlative results relative to the classifier(s) used for write operations.

In one example, classifier functions may be assigned by explicit association. For example, configuration data provided by a client of the distributed system may provide a list of queries and corresponding classification functions. In another example, a classifier may be explicitly assigned to a table.

Figure 4:
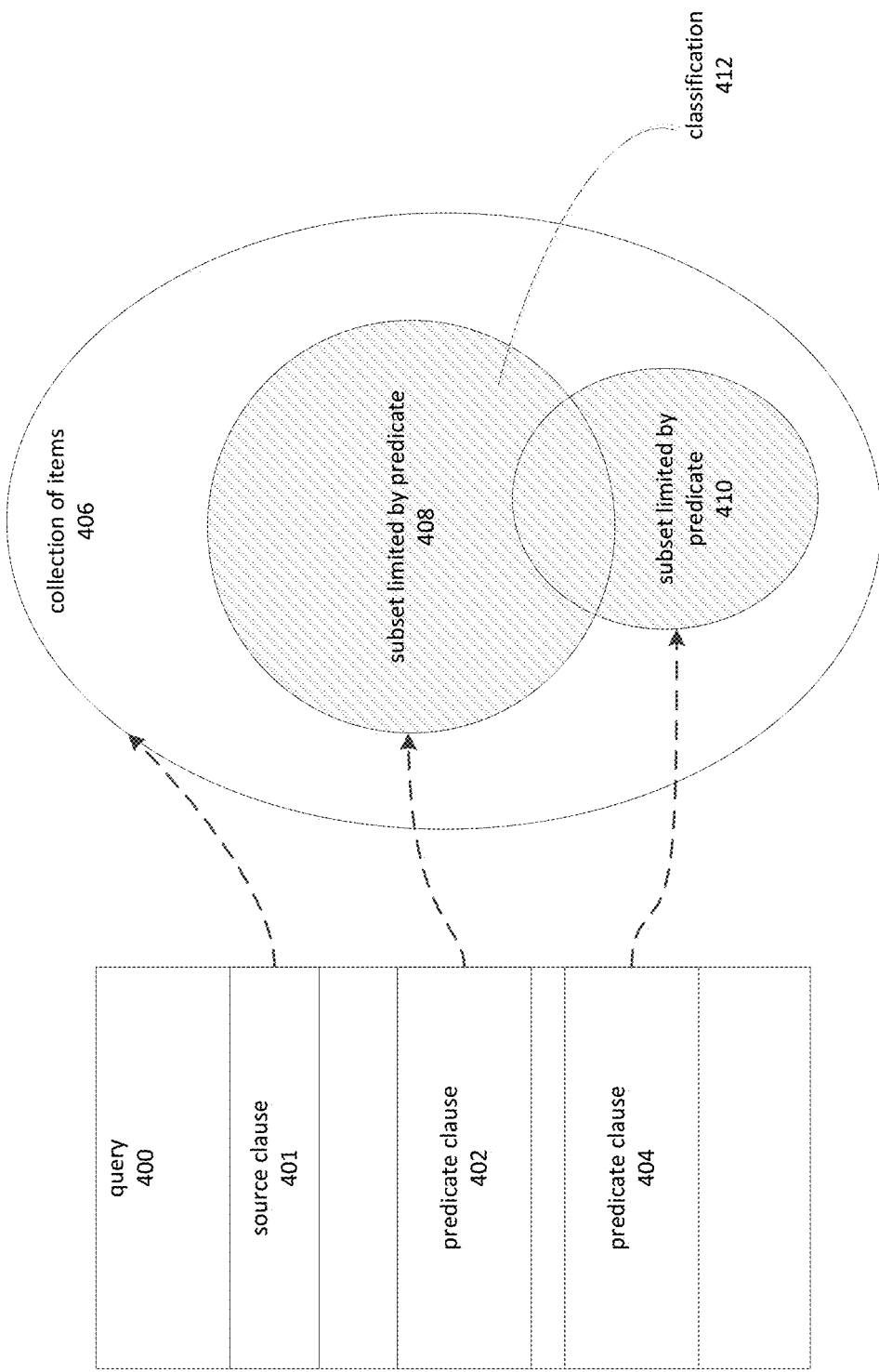
FIG. 4 is a block diagram depicting an example of deriving a classification function from a query.

In another example, a classification function may be derived from a query. FIG. 4 is a block diagram depicting an example of deriving a classification function from a query. A query 400 may have various constituent elements. For example, a typical structured query language ("SQL") query may consist of a "select" clause, a "from" clause, and a "where" clause, respectively referring to what columns of data are to be selected, the table where the data is to be obtained from, and how the data is to be filtered. In FIG. 4, the query 400 is shown to have a source clause 401 and two predicate clauses 402, 404. The query 400 may have other components not shown in FIG. 4. The source clause 401 may define the source of data to be referenced in the query. It may, for example, correspond to the "from" clause of a SQL query, or to a combination of a "select" clause and a "from" clause. The source clause 401 may generally relate to the collection of items 406 that is the subject of the query, and also be used to identify an item to which a classification pertains.

Predicate clauses 402, 404 may define filters or other criteria that limit the results of the query 400. For example, a predicate clause 402 might correspond to the "where" clause of a SQL query. As depicted in FIG. 4, a predicate clause 402 may limit the results of the query to a subset 408. For example, the items applicable to a query with a predicate of "A<100" would be limited to those whose "A" value was less than 100. Similarly, the predicate clause 404 might also limit the results of the query 400 to a subset 410. For example, the predicate "B=2" would limit the results of the query to those items with "B" values of 2.

A classification 412 of items potentially accessed by execution of the query 400 may be based on a union of the subsets 408, 410. In an embodiment, identifying a classification function from a query may involve forming a normalized version of the query. For example, the query may be converted to a disjunctive normal form. Predicate clauses in the normalized query may be identified and used as the basis of a classification function. In the example of FIG. 4, the classification function might be based on defining a function in which the identified predicate clauses identify as true for all items falling within the classification 412.

A classifier function may return an identifier associated with the classification 412. The identifier returned from the classifier may be used to form a read signature or a write signature, typically by first hashing the identifier and then incorporating the hash into a read signature or a write signature.

Figure 5:
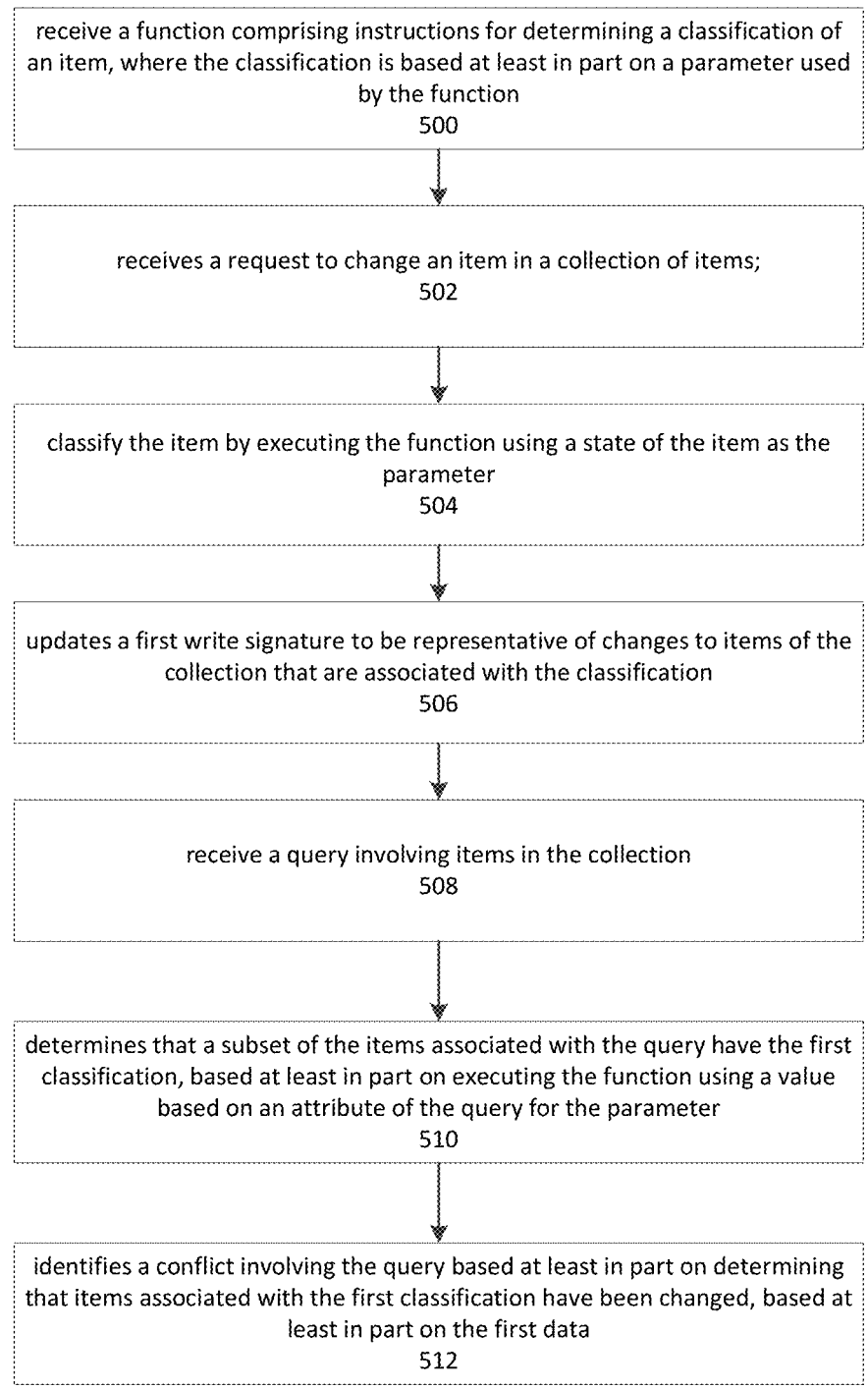
FIG. 5 is a flow diagram depicting an example process for identifying conflicts using classifier-based read and write signatures.

FIG. 5 is a flow diagram depicting an example process for identifying conflicts using classifier-based read and write signatures. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 500 depicts receiving a function for determining the classification of an item. An item may, for example, refer to a row of a relationally structured table or a related set of attributes organized by name-value pairs. The function may comprise executable instructions for determining a classification based on a parameter supplied to the function and referenced during execution of the instructions that make up the function.

Block 502 depicts receiving a request to change an item. For example, a request (or, similarly, a command) to update an item may include an identification of the targeted item, specifications of columns or attributes of the items that are to be changed, and the values those columns or attributes are to be changed to.

Block 504 depicts determining classification of an item that is to be changed. The classification may be obtained, for example, by conflict detection module invoking the classification function. By doing so, the instructions of the function may be executed. The conflict detection module may supply a state of the item as a parameter to the function. In some cases, the state supplied as a parameter might refer to the value of a column or attribute of the item. The function may, in some cases, use multiple such parameters.

Block 506 depicts that the conflict detection module may update a data structure to contain a write signature representative of changes to one or more items that are associated with the classification. The signature may be stored in a compressed hash table, bloom filter or other such structure. An entry in the structure may represent a set of values that make up a write signature. The write signature may comprise, for example, a hash of the classification, or more precisely a hash of an identifier that corresponds to the classification. More than one item may correspond to a given classification. As such, a write signature may represent more than one item. In other words, the presence of a write signature indicates that one or more items of that class have been inserted, updated, or deleted.

A separate write signature may be entered for the prior state of an item and for a subsequent state. In the case of an updated item, this may correspond to signatures for two distinct classes of data if the update is such that the classification changes as a result of the update. In the case of inserts, a "null" classification may be used for the initial state, and the subsequent state may be handled normally. For deletes, the opposite approach may be used.

Block 508 depicts receiving information indicative of a query that involves access to at least one item in the collection. For example, the conflict detection module may receive information indicating that a query is to be processed by the system. The information may, moreover, describe the particular query that is to be executed. The query may involve access to an item if the item is to be referenced in some capacity during processing of the query. For example, a value used to correlate rows in a join operation may be treated by the system as accessed, for the purpose of conflict detection.

A classification associated with a query may be prospective regarding items not yet added to the collection of data. In other words, the classification may encompass items that may not have been added to the collection, or which are not currently associated with the same class of items. However, an item might be subsequently added to the collection of data that would fall within the query's ambit of potentially accessed items. Alternatively, an existing item might be modified so that it falls within a query's classification. In either case, a conflict might exist and may be detected by using a read signature corresponding to the query's classification.

In response to receiving a query, a data structure may be updated to be indicative of a query that may affect existing and prospective items. For example, a data structure comprising read signatures may be updated to include a read signature corresponding to the classification. Subsequently, if an item is inserted or modified such that it becomes associated with the classification, the conflict may be detected using the updated data structure.

Block 510 depicts determining that a subset of items is associated with the query, and that items in the subset have the first classification. The classification of items in a query may be identified using a process in which the classification function is invoked using a value or values derived from one or more attributes of a query. For example, the system may receive information that maps between specific queries and attributes of those queries to classification functions. Typically, the attributes may be those specified in predicate clauses, such as the where clause of a SQL query.

Block 512 depicts identifying a conflict that involves the query. The conflict detection module may, having determined a classification of an item accessed (or likely to be accessed) by the query, compare the classification to those having corresponding write signatures. If a classification associated with the query has the same classification as a write signature, a conflict may exist since at least one item, similar to one accessed by the query, has been modified.

Figure 6:
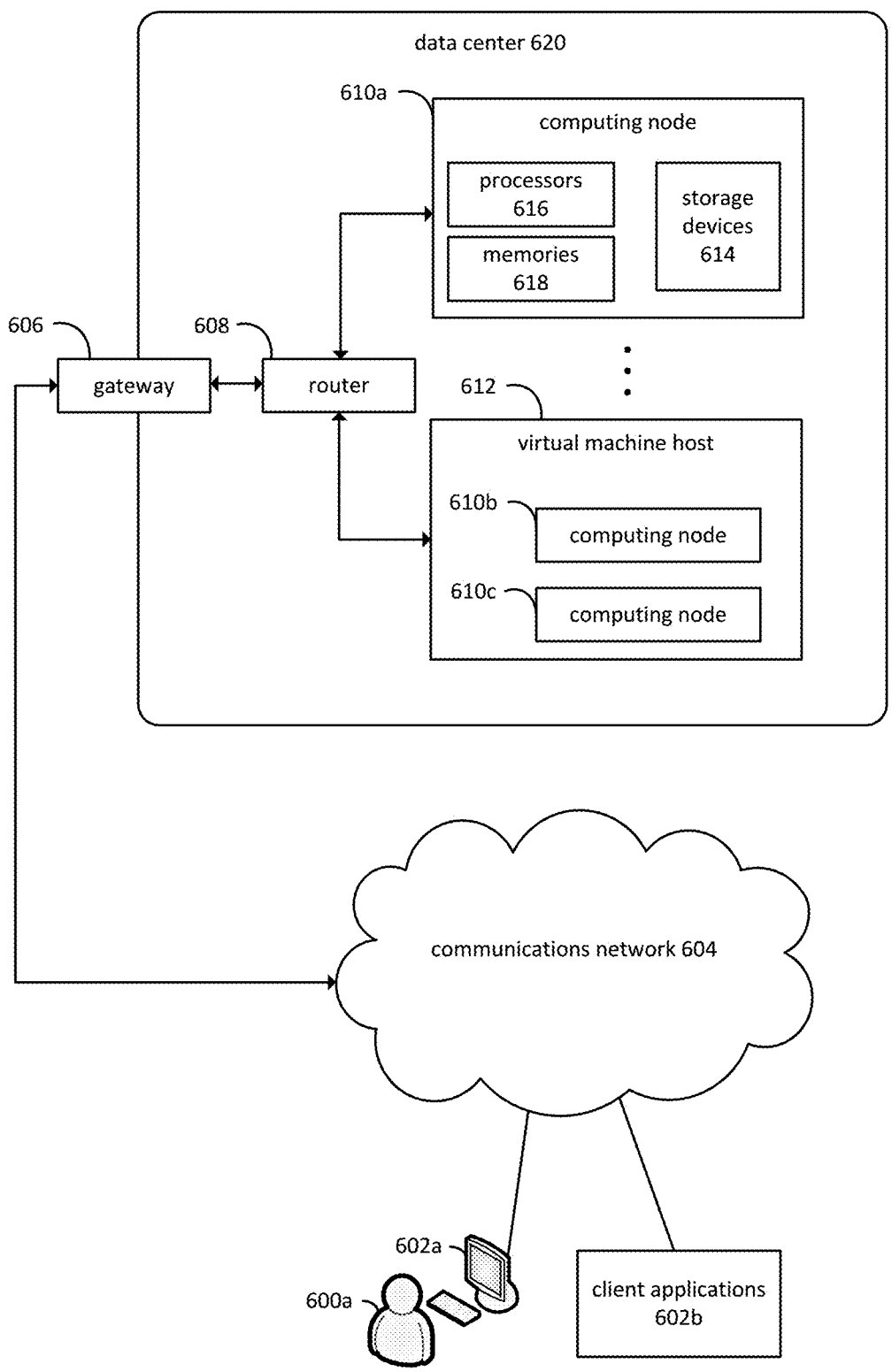
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b, and 610c within a data center 620. Alternatively, client applications 602b may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610a, 610b, and 610c, operating within data center 620, may be provided via gateway 606 and router 608. Numerous other network configurations may also be employed. Although not explicitly depicted in FIG. 6, various authentication mechanisms, web service layers, business objects, or other intermediate layers may be provided to mediate communication with the processes executing on computing nodes 610a, 610b, and 610c. Some of these intermediate layers may themselves comprise processes executing on one or more of the computing nodes. Computing nodes 610a, 610b, and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618, and one or more storage devices 614. Processes on computing node 610a may execute in conjunction with an operating system or alternatively may execute as a bare-metal process that directly interacts with physical resources, such as processors 616, memories 618, or storage devices 614.

Computing nodes 610b and 610c are depicted as operating on virtual machine host 612, which may provide shared access to various physical resources, such as physical processors, memory, and storage devices. Any number of virtualization mechanisms might be employed to host the computing nodes.

The various computing nodes depicted in FIG. 6 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
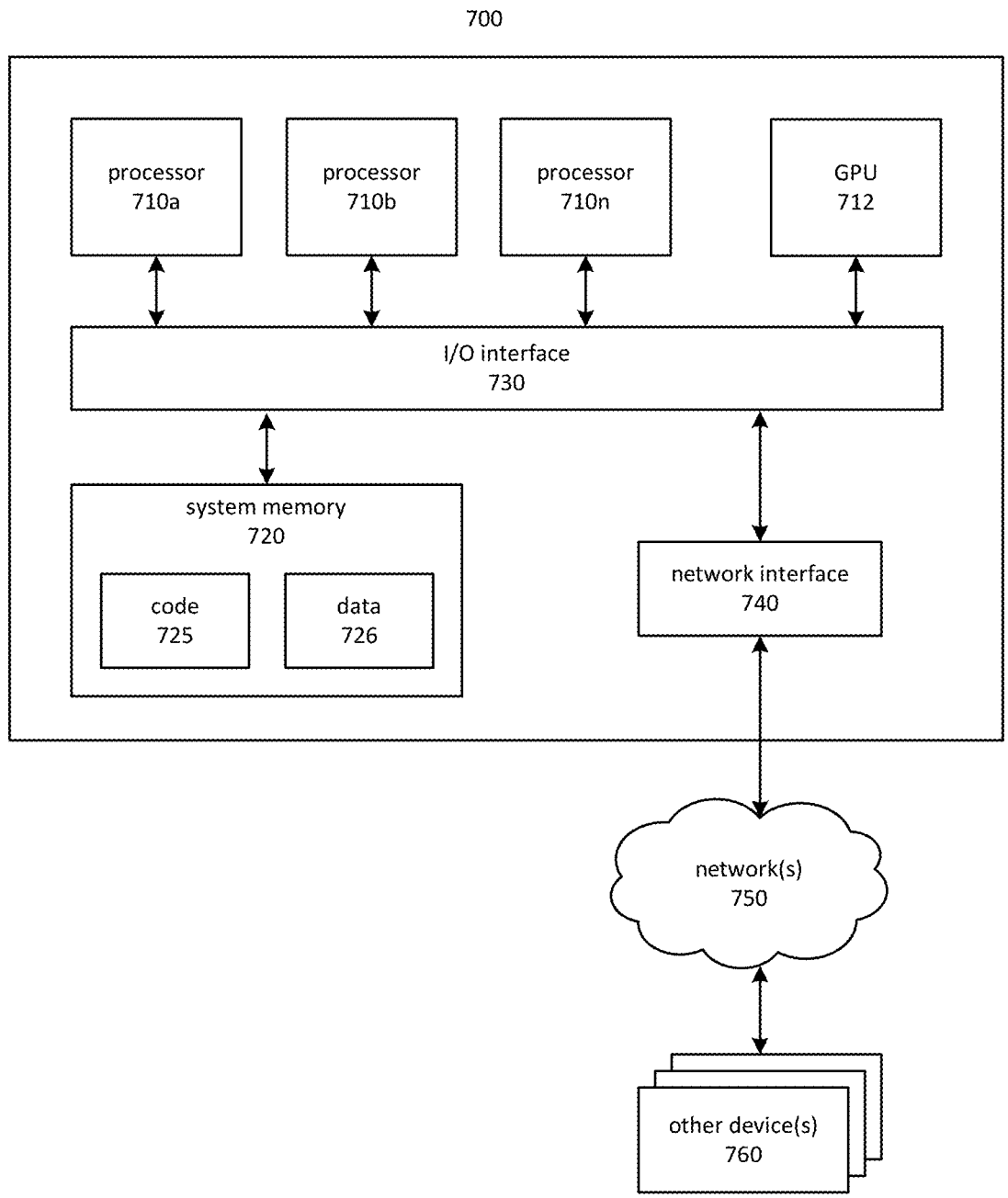
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710) coupled to a system memory 720 via an input/output ("I/O") interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 720 as code 725 and data 726.

In one embodiment, I/O interface 730 may be configured to coordinate I/O traffic between processor 710, system memory 720, and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect ("PCI") bus standard or the Universal Serial Bus ("USB") standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
a storage device configured to store thereon a collection of data comprising a plurality of items maintained by a database; and
a computing node in communication with the storage device in order to maintain the plurality of items, wherein the computing node at least:
stores first instructions received from a client of the database, the first instructions for determining a classification of an item of the plurality of items, wherein the first instructions, when executed, determine the classification based at least in part on evaluating a parameter provided to the first instructions upon execution, wherein the parameter corresponds to an attribute of the item of the plurality of items;
in response to a request to change a first item of the plurality of items, determines that the changed first item is associated with a first classification, based at least in part on executing the first instructions and providing a prior state of the first item to the first instructions as the parameter;
updates a first data to be representative of changes to one or more items, of the plurality of items, that are associated with the first classification, wherein a write signature obtained by executing the first instructions is indicative of the first classification;
receives a query of the database, the query associated with at least one item of the plurality of items maintained by the database;
determines the query is associated with the first classification, based at least in part on a read signature obtained by executing a second instructions using an attribute of the query as the parameter; and
identifies a conflict involving the query based at least in part on a comparison of the read signature to the write signature, wherein the comparison indicates that the at least one item has the same classification as the first item.

2. The system of claim 1, wherein the computing node at least:
determines a second classification of the first item, based at least in part on executing the first instructions using the subsequent state as the parameter;
updates a second data to be representative of changes to one or more items, of the plurality of items, that are associated with the second classification; and
identifies the conflict based at least in part on the second data.

3. The system of claim 1, wherein a predicate clause of the query comprises the attribute.

4. The system of claim 1, wherein the computing node at least:
obtains a first identifier by executing the first instructions; and
stores the first data with a hash of the first identifier.

5. The system of claim 1, wherein the computing node at least:
receives information indicative of an association between the query and the first instructions.

6. A method, comprising:
storing first instructions, received from a client of a database, the first instructions are usable for identifying a classification of an item of a plurality of items stored on a storage device by the database, wherein the first instructions, wherein executed, identify the classification based at least in part on an evaluation of a parameter provided to the first instructions, wherein the parameter is associated with a state of the item of the plurality of items;
in response to a request to modify a first item of the plurality of items, determining that the first item is associated with a first classification, based at least in part on a first signature obtained by executing the first instructions and providing a first state of the first item to the first instructions as the parameter;
determining, in response to a query of a database, the query associated with at least one item of the plurality of items, that the at least one item is associated with a second classification, based at least in part on a second signature obtained by executing a second instructions for identifying the second classification using, as the parameter, a value based at least in part on an attribute of the query; and
identifying a conflict based at least in part on a comparison between the first signature and the second signature, wherein the comparison indicates that the at least one item has the same classification of the first item.

7. The method of claim 6, further comprising:
determining an additional classification of the first item, based at least in part on executing the first instructions using a second state of the item as the parameter after the item has been modified; and
identifying the conflict based at least in part on comparing the first classification to the additional classification.

8. The method of claim 6, further comprising:
parsing the query; and
identifying an attribute referenced in a predicate clause of the query based on the parsing.

9. The method of claim 6, further comprising:
obtaining a first identifier by executing the first instructions; and
storing a hash of the first identifier in a data structure representative of one or more items, of the plurality of items, that are associated with the first classification and have been modified.

10. The method of claim 6, further comprising:
receiving information indicative of an association between the query and the first instructions.

11. The method of claim 6, further comprising:
forming a normalized version of the query;
identifying one or more predicate clauses of the normalized version of the query; and
selecting a classification function for the query based at least in part on the one or more predicate clauses.

12. The method of claim 6, wherein the query is received prior to receiving the information indicative of modifying the first item.

13. The method of claim 6, further comprising:
updating a first data structure to be representative of changes to one or more items, of the plurality of items, that are associated with the first classification, the one or more items comprising the first item.

14. A non-transitory computer-readable storage medium comprising executable instructions that, upon execution by a computing device, cause the computing device at least to:
store first instructions received from a client of a database, the first instructions for determining a classification of an item of a plurality of items stored by the database, wherein the first instructions, upon execution, determine the classification based at least in part on evaluating a parameter provided to the first instructions, wherein the parameter corresponds to an attribute of the item of the plurality of items;
in response to a request to change a first item of the plurality of items, obtain a first classification of the first item, based at least in part on executing the first instructions and providing a state of the first item to the first instructions as the parameter;
update a first data to be representative of changes to one or more items, of the plurality of items, that are associated with the first classification, wherein the first data comprises a first signature, obtained by executing the first instructions, indicative of the first classification;
receive a query of at least one item of the plurality of items;
determine that the query is associated with the first classification, based at least in part on the first signature and executing second instructions for determining a classification of the query based at least in part on an attribute of the query, wherein a second signature, associated with the query, is obtained by the execution of the second instructions; and
identify a conflict involving the query based at least in part on the second signature and determining, based at least in part on the first signature, that one or more items associated with the first classification have been changed.

15. The non-transitory computer-readable storage medium of claim 14, comprising further instructions that, upon execution by the computing device, cause the computing device to at least:
determine an additional classification of the first item, based at least in part on executing the first instructions using a second state of the item as the parameter after the item has been modified; and
identify the conflict based at least in part on comparing the first classification to the additional classification.

16. The non-transitory computer-readable storage medium of claim 14, comprising further instructions that, upon execution by the computing device, cause the computing device to at least:
parse the query; and
identify an attribute referenced in a predicate clause of the query based on the parsing.

17. The non-transitory computer-readable storage medium of claim 14, comprising further instructions that, upon execution by the computing device, cause the computing device to at least:
obtain a first identifier by executing the first instructions; and
modify the first data to associate the first identifier with information indicative of the one or more items of the plurality of items that are associated with the first classification and have been modified.

18. The non-transitory computer-readable storage medium of claim 14, comprising further instructions that, upon execution by the computing device, cause the computing device to at least:
form a normalized version of the query;
identify one or more predicate clauses of the normalized version of the query; and
select a classification function for the query based at least in part on the one or more predicate clauses.

19. The non-transitory computer-readable storage medium of claim 18, wherein the classification function is selected to minimize a cardinality of items in the first classification.

20. The non-transitory computer-readable storage medium of claim 14, comprising further instructions that, upon execution by the computing device, cause the computing device to at least:
update a second data to be indicative of a query affecting one or more additional items having the first classification;
receive information indicative of a write operation involving an additional item having the first classification, wherein the information is received after updating the second data; and
identify a conflict between the query and the write operation based at least in part on the second data.

* * * * *